(12) United States Patent
Bohatsch et al.

(10) Patent No.: US 10,837,466 B2
(45) Date of Patent: Nov. 17, 2020

(54) HYDRAULIC SYSTEM WITH SERVO DRIVE AND HYDRAULIC LOAD AND CONTROL UNIT FOR THE HYDRAULIC SYSTEM

(71) Applicant: B&R INDUSTRIAL AUTOMATION GMBH, Eggelsberg (AT)

(72) Inventors: Elmar Bohatsch, Braunau am Inn (AT); Engelbert Gruenbacher, Voecklabruck (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 4 days.

(21) Appl. No.: 16/201,197

(22) Filed: Nov. 27, 2018

(65) Prior Publication Data
US 2019/0162207 A1   May 30, 2019

(30) Foreign Application Priority Data

Nov. 28, 2017 (EP) .................................... 17204151

(51) Int. Cl.
| | | |
|---|---|---|
| F15B 9/03 | (2006.01) | |
| F15B 21/08 | (2006.01) | |
| G05B 19/46 | (2006.01) | |
| F15B 15/08 | (2006.01) | |

(52) U.S. Cl.
CPC ............ *F15B 9/03* (2013.01); *F15B 15/08* (2013.01); *F15B 21/08* (2013.01); *G05B 19/46* (2013.01); *F15B 2211/20515* (2013.01); *F15B 2211/275* (2013.01); *F15B 2211/633* (2013.01); *F15B 2211/6313* (2013.01); *F15B 2211/6651* (2013.01); *F15B 2211/6656* (2013.01); *G05B 2219/41273* (2013.01)

(58) Field of Classification Search
CPC ............ F15B 9/03; F15B 15/08; F15B 21/08

USPC ............................................................. 60/431
See application file for complete search history.

(56) References Cited

U.S. PATENT DOCUMENTS

2014/0219822 A1* 8/2014 Mueller ............... F15B 11/00
417/44.2

FOREIGN PATENT DOCUMENTS

| DE | 10 2013 005 416 | 10/2014 |
| JP | 2015-70668 | 4/2015 |
| WO | 2012/171603 | 12/2012 |

OTHER PUBLICATIONS

Europe Office Action conducted in counterpart Europe Appl. No. 17204151.9 (dated Jun. 15, 2018).

* cited by examiner

*Primary Examiner* — Thomas E Lazo
*Assistant Examiner* — Daniel S Collins
(74) *Attorney, Agent, or Firm* — Greenblum & Bernstein, P.L.C.

(57) ABSTRACT

To utilize and protect a mechanical load torque range of a servo drive in combination with a pump, a control unit is given a target system pressure as a reference variable and an actual system pressure as a control variable. An electric motor torque acting on a pump of the servo drive is specified by the control unit to an electric motor of the servo drive, a volume flow at the hydraulic load is generated by the pump, by which a mechanical load torque sets it at the electric motor and the actual system pressure is produced in the hydraulic load via the volume flow. A dynamic system variable of the hydraulic system is transmitted to the limiting unit. The limiting unit limits the motor torque transmitted by the control unit to the electric motor as a function of the value of the system variable.

17 Claims, 3 Drawing Sheets

HYDRAULIC SYSTEM WITH SERVO DRIVE AND HYDRAULIC LOAD AND CONTROL UNIT FOR THE HYDRAULIC SYSTEM

CROSS-REFERENCE TO RELATED APPLICATIONS

The present application claims priority under 35 U.S.C. § 119(a) of European Patent Application No. EP 17204151.9 filed Nov. 28, 2017, the disclosure of which is expressly incorporated by reference herein in its entirety.

BACKGROUND OF THE INVENTION

1. Field of the Invention

The present invention relates to a method for controlling the actual system pressure of a hydraulic load of a hydraulic system, wherein a control unit is given a target system pressure as a reference variable and the actual system pressure as a control variable, the control unit of an electric motor of a servo drive specifies an electric motor torque, which acts on a pump of the servo drive, the pump generates a volume flow at the hydraulic load, by means of which a mechanical load torque sets in at the electric motor, and the actual system pressure is generated in the hydraulic load via the volume flow. Furthermore, the present invention relates to a hydraulic system comprising a servo drive composed of an electric motor and a pump, a control unit and a hydraulic load, wherein a control unit is given a target system pressure as a reference variable and the actual system pressure of the hydraulic load as a control variable, and the control unit specifies an electric torque as a control variable for the electric motor, the electric torque transmits the motor torque to the pump, with which the pump generates a volume flow at the hydraulic load, by means of which the actual system pressure is generated, and wherein a mechanical load torque sets in at the electric motor.

2. Discussion of Background Information

Hydraulic systems consist of hydraulic generators and hydraulic loads. Generally, a servo drive serves as the hydraulic generator; for example, hydraulic cylinders, hydromotors, hydraulic capacities and so on can serve as hydraulic loads. In this context, a servo drive typically refers to a combination of an electric motor and a pump, wherein the electric motor is supplied with motor current by an inverter. A control unit is prescribed a target system pressure to be controlled, which is to be adjusted, for which a current actual system pressure of the hydraulic load, which is to be compared to the target system pressure, is also measured. To this end, the control unit transmits to the electric motor a highly dynamic electric motor torque, which is transmitted to the pump. This transmission generally occurs from a motor shaft of the electric motor, preferably via a coupling, to a pump shaft of the pump. The pump supplies a hydraulic volume flow, dependent on the supplied mechanical motor torque, of a supplied medium of the hydraulic load, wherein a mechanical load torque sets in at the electric motor. This variable volume flow of the medium causes a change of the hydraulic actual system pressure in the hydraulic load of the hydraulic system, which is supplied back to the control unit as a control variable. Typically, a controller of a hydraulic system has a PID structure or a PID-like structure with additional filters. The individual components of the electric motor and the pump are each mechanically configured to the maximum permissible mechanical load torque. Therefore, it is naturally desirable that the mechanical load torque required by the controller does not exceed a permissible maximum load torque. However, in certain applications, very high accelerations of the motor speed are required for a rapid increase or decrease of the system pressure. For example, a negative electric motor torque is set to decelerate the pump to a standstill. However, if a negative electric motor torque is applied to the electric motor for too long, the mechanical load torque may also become negative, which means that the electric motor turns backwards. This typically results in destruction of the pump. To prevent this, the servo drive is currently restricted, both in permissible maximum and minimum (electrical) motor torque as well as in the permissible change rate of the motor torque, to prevent the load torque from exceeding the permissible limits. Typically fixed limit values are specified for the maximum and minimum (electrical) motor torque or the motor current is also kept within fixed limits, with which however the performance of the servo drive cannot be fully utilized, wherein the pump is operated within the specified limits for occurring torques and in the specified direction of rotation.

SUMMARY OF THE EMBODIMENTS

Embodiments better utilize and protect a possible range of the mechanical load torque of a servo drive in combination with a pump.

According to embodiments, a method and a device, wherein a dynamic system variable of the hydraulic system is transmitted to a limiting unit, and the limiting unit is limited by the motor torque transmitted by the control unit to the electric motor as a function of the value of the system variable. Compared to the specified fixed limits of the motor torque, the solution according to the invention has the advantage that the motor torque can be limited in a highly dynamic manner as a function of the current value of a variable system parameter, e.g., actual system pressure, motor speed, and so on. In this way, one can respond to the current operating state of the hydraulic system on a case-by-case basis. (Electrical) motor torques may thereby be generated, which exceed conventional maximum and minimum limits of the motor torque specified in prior art, which however do not cause any impermissible load torque (e.g., a load torque outside of the permitted maximum or minimum limits, or a load torque above an upper limit) in the respective operating state of the hydraulic system. In this way, an electrical motor torque can also be negative for example to quickly decelerate a mechanically coupled load, e.g., in the form of a pump, to a rotation speed of zero, wherein a thereby occurring mechanical load torque is quickly reduced. Naturally, the motor torque must still be limited in a timely manner, before the direction of rotation switches signs (i.e., reverses), which would result in the destruction or at least an overloading of the pump. The limiting unit can thereby be switched between control unit and servo drive, or the electric motor of the servo drive, to limit the motor torque or to naturally also be an integral component of the control unit or (of a motor control unit) of the electric motor.

Advantageously a calculation unit, by using the system parameter, calculates an estimated load torque and transmits it to the limiting unit, which in turn limits the motor torque as a function of the value of the estimated load torque. In other words, the estimated load torque is derived in the calculation unit from the current system variable of the hydraulic system. The estimated load torque determined in this manner is used by the limiting unit to limit the motor torque specified by the control unit to the extent necessary in the current operating state of the hydraulic system. Therefore, the full motor torque specified by the control unit is not necessarily passed on to the servo drive, or the motor control unit of the electric motor, but limited if needed by the limiting unit. As soon as this need no longer exists, the motor torque is advantageously no longer limited, Since the estimated load torque approximates the actually occurring load torque, it can thus be indirectly monitored and limited for every point in time of the control cycle.

Advantageously, a comparison unit is given a minimum load torque threshold, preferably zero, and/or a maximum load torque threshold, and the estimated load torque is transmitted by the calculation unit to the comparison unit. The comparison unit verifies whether the estimated load moment falls below the minimum load torque threshold and/or exceeds the maximum load torque threshold, and in the event of a pending undershoot/overshoot, it transmits a signal to the limiting unit. Upon receiving the signal, the limiting unit limits the motor torque, i.e., does not permit at this moment any further increase or decrease of the motor torque. In this way, one prevents the estimated load torque from actually falling below the minimum load torque threshold and/or exceeding the maximum load torque threshold. If subsequently, there is no imminent overshooting or undershooting of the maximum or minimum load torque threshold respectively, the motor torque is advantageously no longer limited, which can be signaled to the limiting unit by the absence of a signal sent by the comparison unit or other ways, for example a release signal of the motor torque supplied by the control unit.

Thus, on the one hand, one can ensure by means of the maximum load torque threshold that the estimated load torque and thus, given corresponding selected variables, also the actually occurring load torque do not reach any impermissibly high values (greater than the maximum load torque), In this way, one can not only protect the electric motor and pump, but also additional existing components, such as a motor shaft, pump shaft, coupling, and so on, from an excessively high load torque.

On the other hand, if a minimum load torque threshold of zero is preferably specified, one can ensure that the occurring estimated load torque and thus also the occurring load torque do not become negative. In this way, one can prevent a reverse rotation of the electric motor and thus the pump.

Of course, a maximum load torque threshold as well as a minimum load torque threshold can be specified, with which a range of the permissible estimated load torque is established. The limiting unit thus takes into account here the minimum and/or maximum load torque thresholds to limit the electrical motor torque. In turn, the actually occurring mechanical load torque is thereby limited.

The estimated load torque can be calculated using a hydraulic system model, wherein the motor speed serves as the system variable. The model can be described by the formula $$M_{last} = M_{motor} - \frac{k_v}{2\pi}\omega_{motor} - J_{motor} \cdot \dot{\omega}_{motor}$$

having the parameters of electrical motor torque, moment of inertia of the motor, and torque constant. The dot above the variable thereby designates, as is known, the Newtonian notation of a derivative based on time. The variables of the mentioned formula are present as measured values or known parameters, or they can be derived from it. The motor speed as a system variable is typically known or can be determined using a simple rotational speed sensor.

The limiting unit can obtain the system variable from the control unit and/or the servo drive and/or the hydraulic load. Naturally, the system variable can also be transmitted by multiple components of hydraulic system 1, e.g., in the sense of a safety-related redundancy.

From the transmission behavior of the drive line, one can determine a corrected torque constant and use it in the model.

The corrected torque constant can be calculated in an operating point from the relationship $$k_v = \frac{(1 - \eta_{pump}) \cdot V_{th} \cdot p_{ist}}{10 \cdot \eta_{pump} \cdot \omega_{motor}},$$

with the supplied pump volume $V_{th}$, actual system pressure $p_{ist}$, pump efficiency $\eta_{pump}$ and motor speeds $\omega_{motor}=2\pi n$. One can thereby precisely determine the calculated motor torque, which can be advantageous if the specified motor torque deviates significantly from the actually indicated motor torque, which would in turn mean that the calculated mechanical load torque deviates significantly from the actual mechanical load torque.

BRIEF DESCRIPTION OF THE DRAWINGS

The present invention is explained in greater detail below with reference to FIGS. 1 to 6, which depict advantageous embodiments of the invention in an illustrative, schematic and non-restricting manner. Thereby depicted are.

DETAILED DESCRIPTION OF THE EMBODIMENTS

Figure 1:
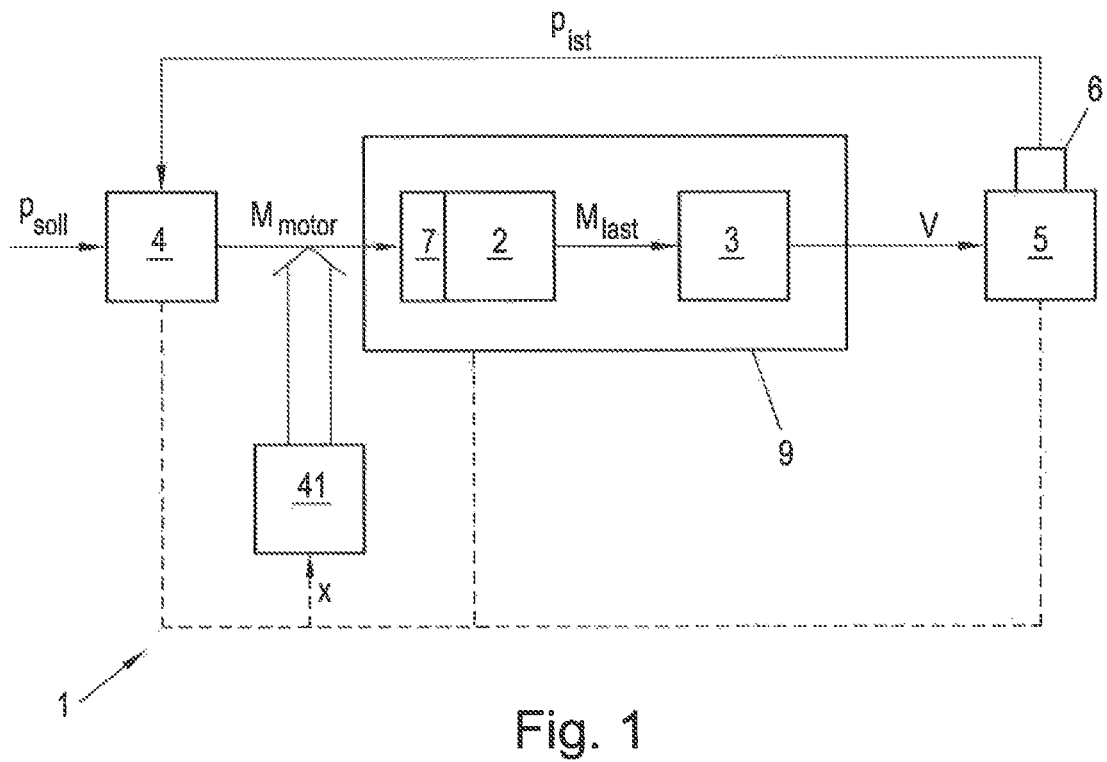
FIG. 1 a hydraulic system having a limiting unit according to the invention.

FIG. 1 depicts a hydraulic system 1. A hydraulic load 5 has an actual system pressure $p_{ist}$, which sets in due to a supplied volume flow V of a medium. Volume flow V is generated by a pump 3, which in turn is driven by an electric motor 2, which typically results via a coupling of a motor shaft of electric motor 2 to a pump shaft of pump 3. Electric motor 2 and pump 3 together form a servo drive 9, which thereby pumps the pumped medium, e.g. hydraulic fluid, to the hydraulic load at volume flow V. To this end, an electric torque $M_{motor}$ is generated at electric motor 2 via a torque-generating current. Mechanical load torque $M_{last}$ thus represents the torque, which sets in at the inlet of pump 3, e.g., at the pump shaft, when that volume flow V is provided in hydraulic load 5, which produces the desired actual system pressure $p_{ist}$.

A control unit 4, e.g., a programmable logic controller (PLC), is given a target system pressure $p_{soll}$ as a control variable, wherein this specification may be provided for example by a user or a control program. In addition, control unit 4 also receives current actual system pressure $p_{ist}$ as a feedback control variable from hydraulic load 5. In addition, actual system pressure $p_{ist}$ can be measured with a pressure sensor 6 for example. Thus, in the course of controlling motor control unit 7 of electric motor 2, typically an inverter, control unit 4 specifies electrical motor torque $M_{motor}$ (or equivalently also a motor current), by means of which mechanical load torque $M_{last}$, dependent on pump 3 or hydraulic load 5, sets in at electric motor 2.

The actual electric motor torque $M_{motor}$ can be estimated in a known manner by means of the motor current flowing through the windings of electric motor 2. However, mechanical load torque $M_{last}$ differs from electrical motor torque $M_{motor}$, e.g., by an accelerated inertia of the motor plus friction losses, and is thus generally less than electrical motor torque $M_{motor}$. The mechanical load torque $M_{last}$ actually occurring between electric motor 2 and pump 3 is typically not measured in a servo drive 9 and can therefore also not be limited directly, which is why in prior art, fixed limits are provided at control unit 4 for electrical motor torque $M_{motor}$. However, according to the invention a limiting unit 41 is provided, which uses an available, for example measured, dynamic system variable x of hydraulic system 1 to limit, based on that, motor torque $M_{motor}$ delivered by control unit 4 to servo drive 9, as shown by the arrow in FIG. 1. Since dynamic system variable x depends on the state of hydraulic system 1 and is thus directly or indirectly dependent on motor torque $M_{motor}$ and thus also on the occurring load torque $M_{last}$, it is thereby possible to dynamically limit motor torque $M_{motor}$. This limiting of motor torque $M_{motor}$ is thereby not rigidly specified as in prior art, but can vary from moment to moment as a function of the respective operating state of the hydraulic system. In this way, motor torques $M_{motor}$ can be applied to electric motor 2 of servo drive 9, which would not have been permitted in the case of rigidly specified limits of motor torque $M_{motor}$. However, for these elevated or even negative motor torques $M_{motor}$, system variable x must thereby result in no unpermitted state of hydraulic system 1, such as an excessively high or negative load torque $M_{last}$.

As indicated in FIG. 1 by the dashed arrows, limiting unit 41 can obtain system variable x from any component of hydraulic system 1, for example control unit 4, servo drive 9, hydraulic load 5, etc. A redundant construction is also conceivable—to the extent the system variable x of this component is available or can be derived from it.

Figure 2:
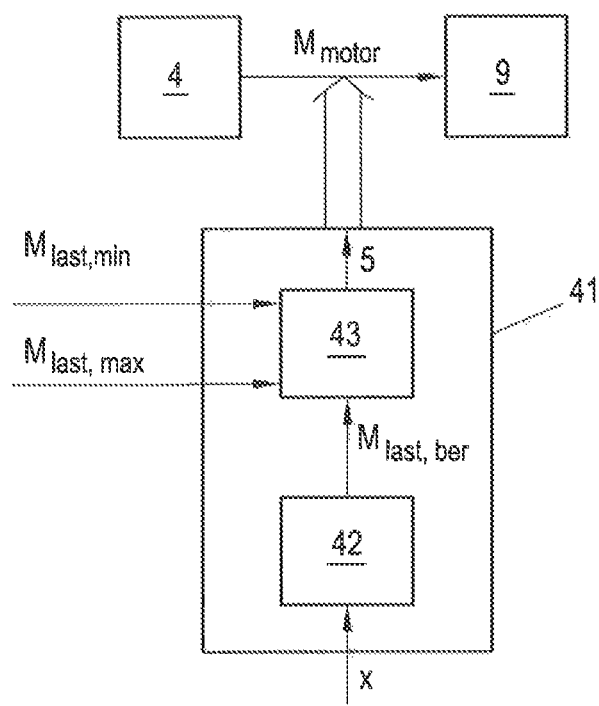
FIG. 2 a limiting unit having a comparison unit and a calculation unit.

FIG. 2 depicts an advantageous embodiment. An estimated load torque $M_{last,ber}$, which approximates actual mechanical load torque $M_{last}$, is determined in a calculation unit 42 via system variable x. Calculated mechanical load torque $M_{last,ber}$ represents an adequate estimate of the currently occurring actual mechanical load torque $M_{last}$, by means of which dynamic load torque $M_{last}$ can be limited by limiting motor torque $M_{motor}$. Calculation unit 42 thus serves as a type of shaft torque monitor.

Advantageously, motor speed $\omega_{motor}$ can serve as system variable x; naturally, other or additional system variables x of hydraulic system 1 can be used to estimate mechanical load torque $M_{last\_ber}$ in limiting unit 41, for example volume flow V or electrical motor torque $M_{motor}$, and so on.

In FIG. 2, there is also advantageously provided a comparison unit, which is connected to limiting unit 41 and calculation unit 42, and is advantageously an integral component of limiting unit 41. Comparison unit 43 is given a maximum load torque threshold $M_{last,max}$ and/or a minimum load torque threshold $M_{last,min}$. Comparison unit 42 verifies whether estimated load torque $M_{last}$ exceeds or is likely to exceed maximum load torque threshold $M_{last,max}$ and/or a minimum load torque threshold $M_{last,min}$, and in the event of a overshoot or a pending overshoot, it delivers a signal s to limiting unit 41. Limiting unit 41 then limits motor torque $M_{motor}$, upon receiving signal s. This means that in this case even if control unit 4 specifies a higher or lower motor torque $M_{motor}$, the limiting unit 41 does not forward these motor torque $M_{last}$ values to the servo drive 9, for example to prevent an impermissible load torque $M_{last}$. As shown in FIG. 2, comparison unit 43 and calculation unit 42 may be an integral component of the limiting unit 41, or they may also represent independent components. Limiting unit 41 may also be an integral component of control unit 4 or motor control unit 7 of electric motor 2.

To implement the shaft torque monitor in limiting unit 41, servo drive 9 can be modeled as a control loop using the following model:

$$\dot{\omega}_{motor} = \frac{k}{2\pi \cdot J_{ges}} \omega_{motor} + \frac{1}{J_{ges}} M_{motor} - \frac{1}{J_{ges}} M_{last}$$

$\omega_{motor}$ thereby refers to the motor speed, k is the torque constant, $J_{ges}$ is the known moment of inertia, $M_{motor}$ is the electrical motor torque and $M_{last}$ is the mechanical load torque. From this model, one can determine through conversion an estimated mechanical load torque $M_{last}$ as an approximation of mechanical load torque $M_{last}$ at the motor shaft of electric motor 2, or pump shaft of pump 3.

$$M_{load} = M_{motor} - \frac{k}{2\pi} \omega_{motor} - J_{ges} \cdot \dot{\omega}_{motor}$$

The mechanical load torque results from the motor torque decreased by a factor, which stems from a viscous friction of the pump and an acceleration of inertia.

Electric motor torque $M_{motor}$ as a calculated control variable is naturally known to the control unit 4, as is the motor speed the servo drive 9, which is normally provided by the servo drive 9 and serves as variable x. The moment of inertia $J_{ges}$ of the servo drive 9 includes the moment of inertia of the motor $J_{motor}$, moment of inertia of the coupling $J_{coupling}$ (if present) and the moment of inertia of the shaft $J_{shaft}$, which are known or can be drawn from data sheets of the respective components. The moment of inertia of the motor $J_{motor}$ thereby represents the dominant portion of the moment of inertia $J_{ges}$, with which the inertial torque $J_{ges}$ is also approximated by the inertial motor torque $J_{motor}$ of the electric motor 2.

In actual practice, it has been found that the torque constant $k_0$ specified by the manufacturer over the work range of the electric motor 2 deviates from the actual torque constant k. This also results in considerable inaccuracy when calculating the calculated load torque $M_{last,ber}$. To reduce this inaccuracy, it may be provided to use a corrected torque constant $k_v$ instead of the specified torque constant k. To do so, one can proceed as follows.

Figure 3:
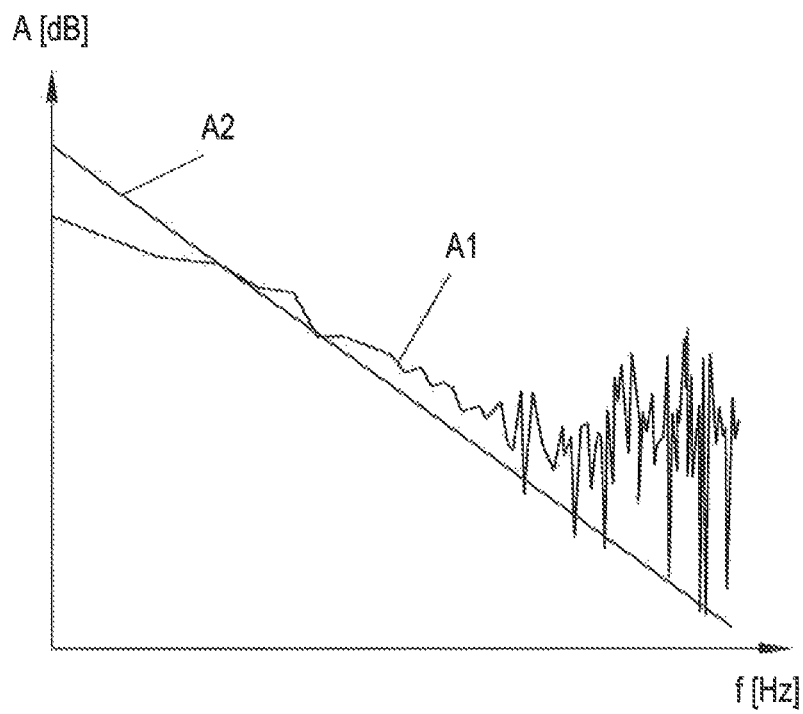
FIG. 3 the transmission function of electrical motor torque to the motor speed.

To determine the transmission behavior of the drive line, i.e., of the electrical motor torque $M_{motor}$ on motor speed $\omega_{motor}$, an excitation signal can be applied to the drive line and one can measure the system response (motor speed) and from that, one can determine in a known manner a frequency response (as a Fourier-transform of the impulse response). In doing so, it was found that in servo pumps the amplitude response A1 of the frequency response corresponds approximately to known amplitude response A2 of a simple inertial mass with viscous friction, as shown in FIG. 3. This realization allows one to conclude that the transmission behavior of the drive line can be described by a simple inertial mass with viscous friction. With this knowledge, one can calculate a corrected torque constant $k_v$, to better approximate actual torque constant k than would have been the case using specified torque constant $k_0$.

To determine the corrected torque constant $k_v$ based on this knowledge, one can first represent the shaft output $P_{shaft}$ at the pump shaft of pump 3 as the product of torque M, factor $2\pi$ and rotation speed n in 1/minutes divided by 60:

$$P_{welle} = \frac{M_{last} \cdot 2\pi \cdot n}{60}.$$

In contrast, the output $P_{pump}$ of pump 3 itself is calculated by the product of pressure p, pump volume per minute Q divided by 600 multiplied by pump efficiency $\eta_{pump}$:

$$P_{pump} \frac{p_{ist} \cdot Q}{600 \cdot \eta_{pump}}.$$

If shaft output $P_{welle}$ and pump output $P_{pump}$ are made equal based on the conservation of energy, the equation $$\frac{M_{last} \cdot 2\pi \cdot n}{60} = \frac{P_{ist} \cdot Q}{600 \cdot \eta_{pump}}$$

results, which can be solved according to mechanical load torque $M_{last}$. In this way, one obtains the mechanical load torque $M_{last}$ at an operating point from the product of the constant theoretical pumping volume of pump $V_{th}=Q/n$, e.g., $V_{th}=160,1$ cm$^3$/rev, and actual system pressure $p_{ist}$, divided by pump efficiency $\eta_{pump}$ multiplied by $20\pi$:

$$M_{last} = \frac{V_{th} \cdot p_{ist}}{20\pi \cdot \eta_{pump}}.$$

Pump efficiency $\eta_{pump}$ can in turn be determined from the pump curve at the operating point, i.e., at a certain motor speed n. The pump curve represents a typical trend of the electrical motor torque $M_{motor}$ of the electrical motor 2 and the mechanical load torque $M_{last}$ of the electric motor 2, or pump 3, and is normally provided by the manufacturer of servo drive 9. In this way, given a rotation speed $n=35$ s$^{-1}$ as an operating point, a pump efficiency $\eta_{pump}$ of 0.85 can be read.

Given an actual pressure $p_{ist}=139.1$ bar, a rotation speed $n=35$ revolutions/s and a pump efficiency $\eta_{pump}$ of 0.85 (i.e., also a factor $1-0.85=0.15$ in losses) results, i.e., in a torque decrease $M_v$ in the amount of 62.54 Nm, which is thereby proportional to the losses $(1-\eta_{pump})$. Taking into account the viscous work, the corrected motor constant $k_v$ thus results in a value of $k_v=1.8$ Nms when dividing torque decrease $M_v$ by rotation speed $n=35$ 1/s:

$$M_v = k_v \cdot n = \frac{(1-\eta_{pump}) \cdot V_{th} \cdot p_{ist}}{20\pi \cdot \eta_{pump}} \Rightarrow$$

$$k_v = \frac{(1-\eta_{pump}) \cdot V_{th} \cdot p_{ist}}{20\pi \cdot \eta_{pump} \cdot n} =$$

$$\frac{0.15 \cdot 160.1 \cdot 139.1}{20\pi \cdot 0.85 \cdot 35} \text{ Nms} = \frac{62.54 \text{ Nms}}{35} = 1.8 \text{ Nms}$$

Corrected torque constant $k_v$ can also be used at the selected operating point for determining, according to the invention, the calculated mechanical load torque:

$$M_{last,ber} = M_{motor} - \frac{k_v}{2\pi}\omega_{motor} - J_{motor} \cdot \dot{\omega}_{motor}$$

Figure 4:
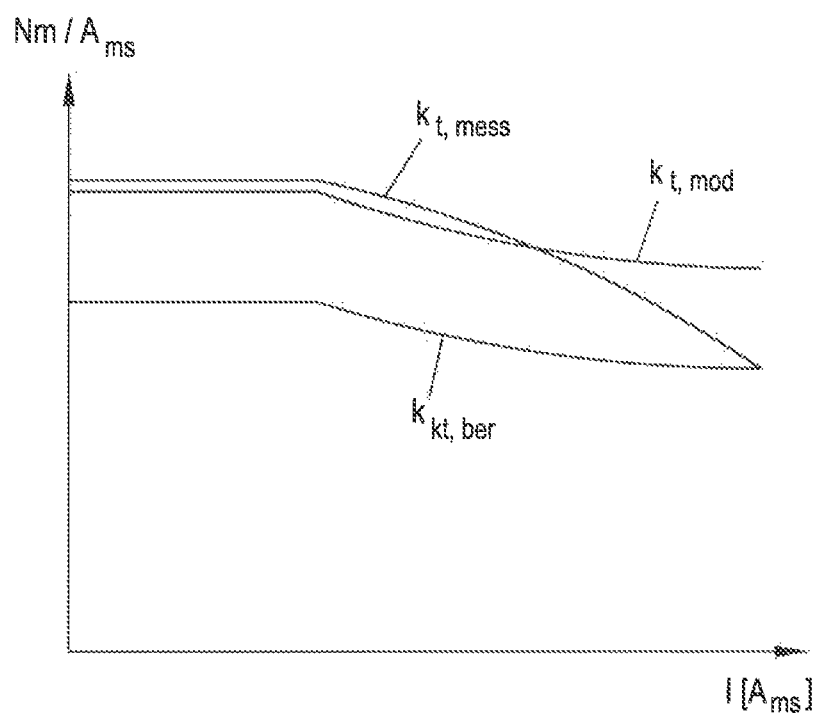
FIG. 4 the trends of the specified motor constant, calculated motor constant and actual motor constant, FIG. 5 the trends of estimated load torques and the actual mechanical load torque, FIG. 6 the trends of a load torque, an estimated load torque and a motor torque.

Motor torque $M_{motor}$ is normally calculated from the product of a motor constant kt and a torque-forming current I. Motor constant kt can be optimized in a known manner. FIG. 4 contrasts conventional trends of calculated motor constants $k_{t,calc}$, optimized motor constant $K_{t,mod}$ and actual measured motor constant $k_{t,meas}$, wherein the respective values were standardized to amperes.

Figure 5:
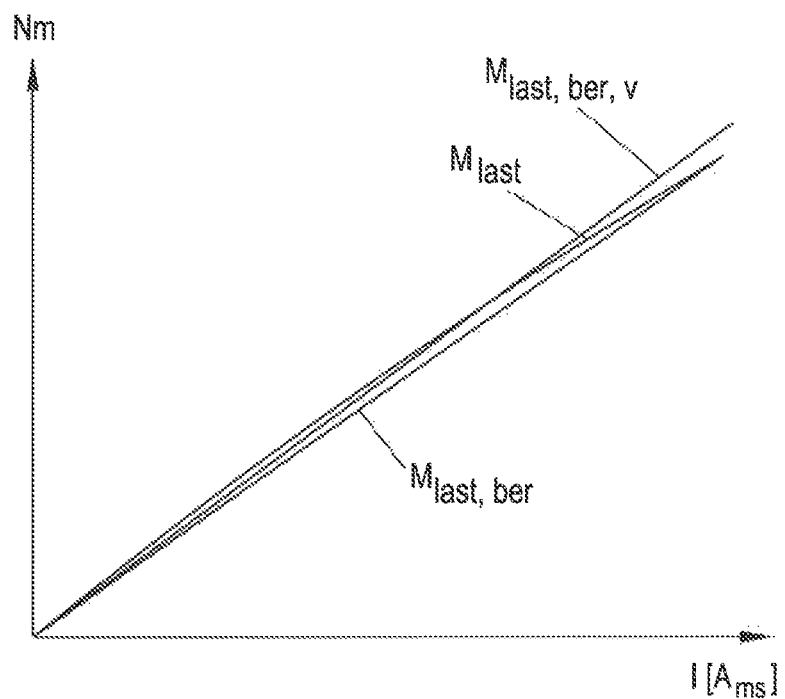

Using a corrected torque constant $k_v$, FIG. 5 contrasts calculated mechanical load torque $M_{last,ber,v}$ and actual load torque $M_{last}$ for an operating cycle of a servo pump. Actual load torque $M_{last}$ was thereby reverse calculated from the measured system pressure $p_{ist}$. One can see that calculated mechanical load torque $M_{last,ber,v}$ using corrected torque constant $k_v$, offers a better approximation of actual load torque $M_{last}$ than calculated mechanical load torque $M_{last,ber}$ which was calculated using specified torque constant $k_0$.

Figure 6:
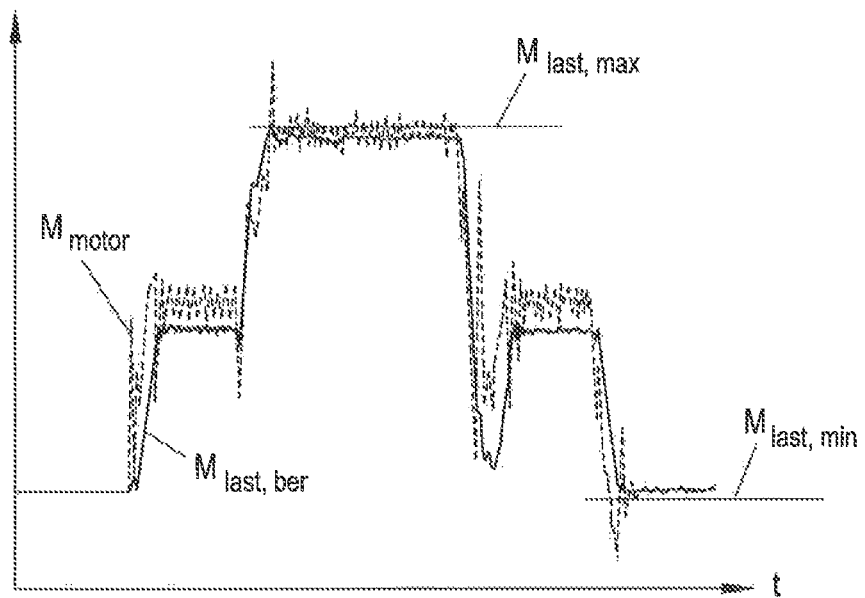

FIG. 6 depicts a typical trend of an estimated load torque $M_{last,ber}$. In FIG. 6, one can also see that motor torque $M_{motor}$ can experience peaks that would extend beyond a permitted load torque $M_{last}$ (for clarity's sake, not drawn in in FIG. 6), yet they do not result in any impermissible values of calculated load torque $M_{last,ber}$ and thus also of actual load torque $M_{last}$. This is possible because, as mentioned, load torque $M_{last}$ responds in a delayed manner to motor torque $M_{motor}$ due to mass inertia, for example. Motor torque $M_{motor}$ is limited only when for example an impermissible estimated load torque $M_{last,ber}$ is reached, which is advantageous in relation to the fixed limits for motor torque $M_{motor}$ on control unit 4. An approximation or overshoot of the estimated load torque $M_{last,ber}$ in regard to the minimum and/or maximum load torque threshold $M_{last,max}$, $M_{last,min}$ may be perceived as an impermissible estimated load torque $M_{last,ber}$. As shown in FIG. 2 for example, estimated load torque $M_{last,ber}$ is calculated by calculation unit 42 using a system variable x (e.g., motor speed $\omega_{motor}$), compared by comparison unit 43 against the minimum or maximum load torque threshold $M_{last,max}$, $M_{last,min}$. In the event of an imminent overshoot, comparison unit 43 emits a signal s to limiting unit 41, which only then limits motor torque $M_{motor}$. As soon as estimated load torque $M_{last,ber}$ begins to take on values again where no overshoot/undershoot of the minimum or maximum load torque thresholds $M_{last,max}$, $M_{last,min}$ is imminent (comparison by comparison unit 43) based on the current value of the system variable in the course of the calculation by calculation unit 42, motor torque $M_{motor}$ is then no longer limited by limiting unit 41. Advantageously, this is signaled to limiting unit 41 by comparison unit 43 by the absence of signal s, another signal, or by other means.

It is hereby also possible in particular for the purpose of load shedding, in other words to quickly stop servo drive 9, to apply a negative motor torque $M_{motor}$ as long as the direction of rotation $M_{last,ber}$ does not change the sign. Before load torque $M_{last}$ becomes negative, the negative motor torque $M_{motor}$ is switched off.

Therefore, load torque $M_{last}$ monitoring according to the invention allows one to operate servo drive 9 in a more dynamic manner.

What is claimed:

1. A method for controlling actual system pressure of a hydraulic load of a hydraulic system, the method comprising:
   supplying a target system pressure as a reference variable and an actual system pressure as a control variable;
   specifying an electric motor torque to an electric motor of a servo drive, which acts on a pump of the servo drive;
   generating a volume flow at the hydraulic load, by which a mechanical load torque sets in at the electric motor; and
   generating the actual system pressure in the hydraulic load via the volume flow,
   wherein a dynamic system variable of the hydraulic system is obtained,
   wherein the electric motor torque transmitted to the electric motor is limited as a function of the value of the dynamic system variable, and
   wherein an estimated load torque is calculated using the dynamic system variable and the electric motor torque is limited as a function of a value of the estimated load torque.

2. The method according to claim 1, wherein a minimum load torque threshold, and/or a maximum load torque threshold is specified for comparison to the estimated load torque,
   wherein the comparison verifies whether the estimated load torque falls below the minimum load torque threshold and/or exceeds the maximum load torque threshold, and in the event of a pending undershoot/overshoot, a signal is sent to limit the motor torque.

3. The method according to claim 1, wherein the estimated load torque is calculated using a model of the hydraulic system, wherein the motor speed serves as a system variable.

4. The method according to claim 3, wherein the model is described by the formula $$M_{last} = M_{motor} - \frac{k_0}{2\pi}\omega_{motor} - J_{ges} \cdot \dot{\omega}_{motor}$$

having the parameters of electric motor torque, moment of inertia of the motor and torque constant.

5. The method according to claim 3, wherein a corrected torque constant ($k_v$) is determined from the transmission behavior of the drive line and used in the model.

6. The method according to claim 5, wherein the corrected torque constant is calculated at an operating point from the relationship $$k_v = \frac{(1 - \eta_{pump}) \cdot V_{th} \cdot p_{ist}}{20\pi \cdot \eta_{pump} \cdot n},$$

using the parameters of pump volume of the pump, actual system pressure, pump efficiency and motor speed.

7. The method according to claim 1, wherein the limiting unit obtains the dynamic system variable from the control unit and/or the servo drive and/or the hydraulic load.

8. A hydraulic system comprising:
   a servo drive composed of an electric motor and a pump; and
   a hydraulic load,
   wherein a target system pressure is specified as a reference variable and an actual system pressure of the hydraulic load is specified as a control variable,
   wherein an electric torque is specified as a variable to the electric motor,
   wherein the electric motor transmits a motor torque to the pump, whereby the pump generates a volume flow at the hydraulic load, by which the actual system pressure is generated, and
   wherein a mechanical load torque sets in at the electric motor,
   wherein the electric motor torque transmitted to the electric motor is limited by using a system variable of the hydraulic system, and
   wherein an estimated load torque is calculated using the system variable for limiting the electric motor torque as a function of the estimated load torque.

9. The hydraulic system according to claim 8, further comprising a limiting unit, which is configured to limit the motor torque transmitted by a control unit to the electric motor is an integral component of the control unit.

10. The hydraulic system according to claim 8, further comprising a calculation unit, which calculates the estimated torque using the system variable, is an integral component of a limiting unit, which is configured to limit the motor torque transmitted to the electric motor.

11. The hydraulic system according to claim 10, further comprising a comparison unit, which is connected to the calculation unit and the limiting unit,
    wherein the comparison unit receives the estimated load torque from the calculation unit and verifies whether the estimated load torque falls below a minimum load torque threshold and/or exceeds a maximum load torque threshold, and
    in an event of an imminent undershoot/overshoot, the comparison unit transmits a signal to the limiting unit, which limits the motor torque upon receiving the signal.

12. The hydraulic system according to claim 11, wherein the comparison unit is an integral component of the limiting unit.

13. The hydraulic system according to claim 8, wherein the estimated load torque is compared to a minimum load torque threshold and/or a maximum load torque threshold, and, in an event the estimated load torque is or is about to be below the minimum load torque threshold and/or the estimated load torque is or is about to be above the maximum load torque threshold, a signal is transmitted to limit the motor torque.

14. The method according to claim 1, wherein a control unit is configured to receive the target system pressure as a reference variable and the actual system pressure as a control variable, and to specify the electric motor torque to an electric motor of a servo drive.

15. The method according to claim 1, wherein a limiting unit is configured to give the dynamic system variable of the hydraulic system and to limit the motor torque transmitted to the electric motor as a function of the value of the dynamic system variable, and wherein a calculation unit is configured to calculate the estimated load torque.

16. The method according to claim 1, wherein a comparison unit is configured to compare the estimated load torque to the minimum load torque threshold and/or the maximum load torque threshold, and
- in an event that the estimated load torque is or is about to be below the minimum load torque threshold and/or the estimated load torque is or is about to exceed the maximum load torque threshold, a signal is sent to limit the motor torque.

17. The method according to claim 2, wherein the minimum load torque threshold is zero.

\* \* \* \* \*